US009326032B2

(12) United States Patent
Molinelli et al.

(10) Patent No.: US 9,326,032 B2
(45) Date of Patent: Apr. 26, 2016

(54) DELIVERY OF WORKOUT VIDEO

(71) Applicants: Elise Joan Molinelli, Santa Monica, CA (US); Judith Evans Molinelli, Manassas, VA (US)

(72) Inventors: Elise Joan Molinelli, Santa Monica, CA (US); Judith Evans Molinelli, Manassas, VA (US)

( * ) Notice: Subject to any disclaimer, the term of this patent is extended or adjusted under 35 U.S.C. 154(b) by 0 days.

(21) Appl. No.: 14/081,775

(22) Filed: Nov. 15, 2013

(65) Prior Publication Data

US 2014/0137170 A1 May 15, 2014

Related U.S. Application Data

(60) Provisional application No. 61/726,576, filed on Nov. 15, 2012.

(51) Int. Cl.
*H04N 21/482* (2011.01)
*H04N 21/472* (2011.01)
*H04N 21/654* (2011.01)
*H04N 21/431* (2011.01)
*H04N 21/231* (2011.01)
*H04N 21/262* (2011.01)
*H04N 21/2543* (2011.01)

(52) U.S. Cl.
CPC .... *H04N 21/47202* (2013.01); *H04N 21/23109* (2013.01); *H04N 21/26258* (2013.01); *H04N 21/431* (2013.01); *H04N 21/482* (2013.01); *H04N 21/4825* (2013.01); *H04N 21/654* (2013.01); *H04N 21/2543* (2013.01)

(58) Field of Classification Search
CPC ............... H04N 21/4825; H04N 21/23109; H04N 21/26258; H04N 21/431; H04N 21/482
See application file for complete search history.

(56) References Cited

U.S. PATENT DOCUMENTS

| 5,362,069 | A | * | 11/1994 | Hall-Tipping | A63B 24/0087 273/148 B |
| 5,949,951 | A | * | 9/1999 | Sklar | A63B 71/0622 386/325 |
| 8,529,409 | B1 | * | 9/2013 | Lesea-Ames | G06F 19/3481 482/8 |
| 2004/0254958 | A1 | * | 12/2004 | Volk | G06F 17/30038 |
| 2005/0019735 | A1 | * | 1/2005 | Demas | A63B 24/00 434/247 |
| 2006/0190959 | A1 | * | 8/2006 | Gatti | G11B 27/105 725/13 |
| 2006/0265730 | A1 | * | 11/2006 | Hays | G06F 17/30053 725/110 |
| 2007/0016928 | A1 | * | 1/2007 | Wesemann | G06Q 30/00 725/46 |
| 2008/0076637 | A1 | * | 3/2008 | Gilley | G06F 19/3406 482/9 |
| 2008/0077619 | A1 | * | 3/2008 | Gilley | G06Q 30/20 |
| 2008/0077620 | A1 | * | 3/2008 | Gilley | G06F 19/3406 |
| 2008/0086318 | A1 | * | 4/2008 | Gilley | G06Q 10/06 705/319 |
| 2008/0103023 | A1 | * | 5/2008 | Chung | G11B 27/034 482/3 |
| 2008/0141135 | A1 | * | 6/2008 | Mason | G11B 27/034 715/719 |
| 2009/0047644 | A1 | * | 2/2009 | Mensah | A63B 24/0075 434/247 |
| 2009/0048939 | A1 | * | 2/2009 | Williams | G06Q 30/0641 705/27.1 |
| 2009/0075782 | A1 | * | 3/2009 | Joubert | A63B 24/0075 482/9 |
| 2009/0193464 | A1 | * | 7/2009 | Friedlander | H04N 5/44543 725/41 |
| 2010/0205228 | A1 | * | 8/2010 | Reese | G06Q 30/02 707/805 |
| 2013/0316316 | A1 | * | 11/2013 | Flavell | A63B 24/0075 434/247 |
| 2014/0013344 | A1 | * | 1/2014 | Taxier | H04N 21/43 725/10 |

* cited by examiner

*Primary Examiner* — Robert Hance
(74) *Attorney, Agent, or Firm* — Beusse Wolter Sanks & Maire, PLLC; Eugene J. Molinelli

(57) ABSTRACT

Techniques for workout video delivery includes presenting to a viewer's client process first data indicates a matrix of video segments including a set of warmup video segments, cool-down video segments and middle video segments. Second data indicating two or more video segments selected by the viewer is obtained from the client process. Video from all the selected video segments is presenting automatically to the viewer.

17 Claims, 3 Drawing Sheets

FIG. 3

DELIVERY OF WORKOUT VIDEO

CROSS-REFERENCE TO RELATED APPLICATIONS

This application claims benefit of Provisional Appln. 61/726,576, filed Nov. 15, 2013, the entire contents of which are hereby incorporated by reference as if fully set forth herein, under 35 U.S.C. §119(e).

BACKGROUND

Multiple services are available that deliver video over the internet to a local device of a user. These include exercise videos that can be viewed on a local device and followed by a user who experiences a workout by following along with the motions displayed on the video. However, a disadvantage of such videos is that there is little opportunity to vary the workout, which can lead to overworking some body parts or loss of interest by the user or both. In one approach, described in U.S. Pat. No. 7,357,756 multiple moves are recorded in separate video segments and selected in a combination tailored to personal needs. However with such an approach, it is difficult to assemble a video stream of significant length to provide a complete workout with continuous instructor guidance.

SUMMARY OF THE INVENTION

The inventor has realized that canned videos of workouts do not compete well with live sessions in which there is a certain amount of feedback from the class on what emphasis to provide, e.g., in the way of body parts to target, and in which the instructor provides some variety in music mix or movement to keep the class interesting and to keep the participants engaged. Therefore, techniques are provided for increasing the variety of workout videos delivered over a network, such as the Internet, to a viewing participant (viewer, hereinafter). These techniques provide the benefits of an in-person workout class that provides varied emphasis and movements, with the convenience of Internet delivery viewing at a time and place chosen by a viewer.

Techniques for workout video delivery include sending first data for presentation at a client process of a viewer. The first data indicates a matrix of video segments including a set of warmup video segments, cool-down video segments and middle video segments. Techniques also include obtaining from the client process second data indicating two or more video segments selected by the viewer. The techniques also include presenting automatically to the viewer video from all the selected segments.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus are described to deliver a complete and varied and tailored workout video. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are described below in the context of certain workout disciplines (e.g., ballet, yoga and interval conditioning) and specific segments. However, the invention is not limited to this context. In other embodiments more or ewer or different video segments are provided in more or fewer or different or identical disciplines, alone or in some combination.

Some embodiments of the invention are described below in the context of a World Wide Web browser communicating over the public Internet with a web server that is configured to provide workout videos that are stored as video format files at a server host. However, the invention is not limited to this context. In other embodiments a specialized client executes on a host accessed by a user while a workout video delivery server executes on one or more of the same or different hosts communicating with or without a network, such as the Internet or a private enterprise network, while storing files on the same or different hosts, or other mechanisms are used to solicit and deliver the workout video. The terms "viewer" and "user" are used interchangeably hereinafter.

1. Overview

A unique matrix of short-form workouts are generated so that the viewer has practically limitless options to create their own personalized fitness flow, tailored to their specific needs so that they can efficiently and effectively reach their goals, without ever being bored by doing the same dvd over and over and over again. With this unique system, the viewer can sequence a personalized routine from several disciplines, such as yoga, interval conditioning, or ballet conditioning options. The viewer can even get as specific as piecing together flows with more "cardio" elements, or more "strength/endurance" based work or target one or more specific muscle groups or body parts, or some combination. For example, in some embodiments the targeted muscle groups include arms, legs, core, buttocks 9 gluteus maximus), full body and cardio. With the ability to target muscle groups, the viewer can target the viewer's fitness regimen to meet the viewer's personal goals. The viewer can achieve weight loss, can build strength, or can attain flexibility, or some combination. This website gives the viewers the tools useful to have it all. Furthermore, in various embodiments these regimens are designed to be so efficient, that even if the viewer only has 10 minutes a day, the viewer can get a quick workout. With thousands of possibilities of sequencing the selected segments, the viewer never has to do the same workout twice. No more boring dvds, or expensive gym memberships & bulky in-home equipment are required. With just 10 minutes and an internet connection, the viewer obtains workouts from a particular instructor, e.g., a sought after celebrity trainer and yoga teacher at the viewer's convenience.

Figure 1:
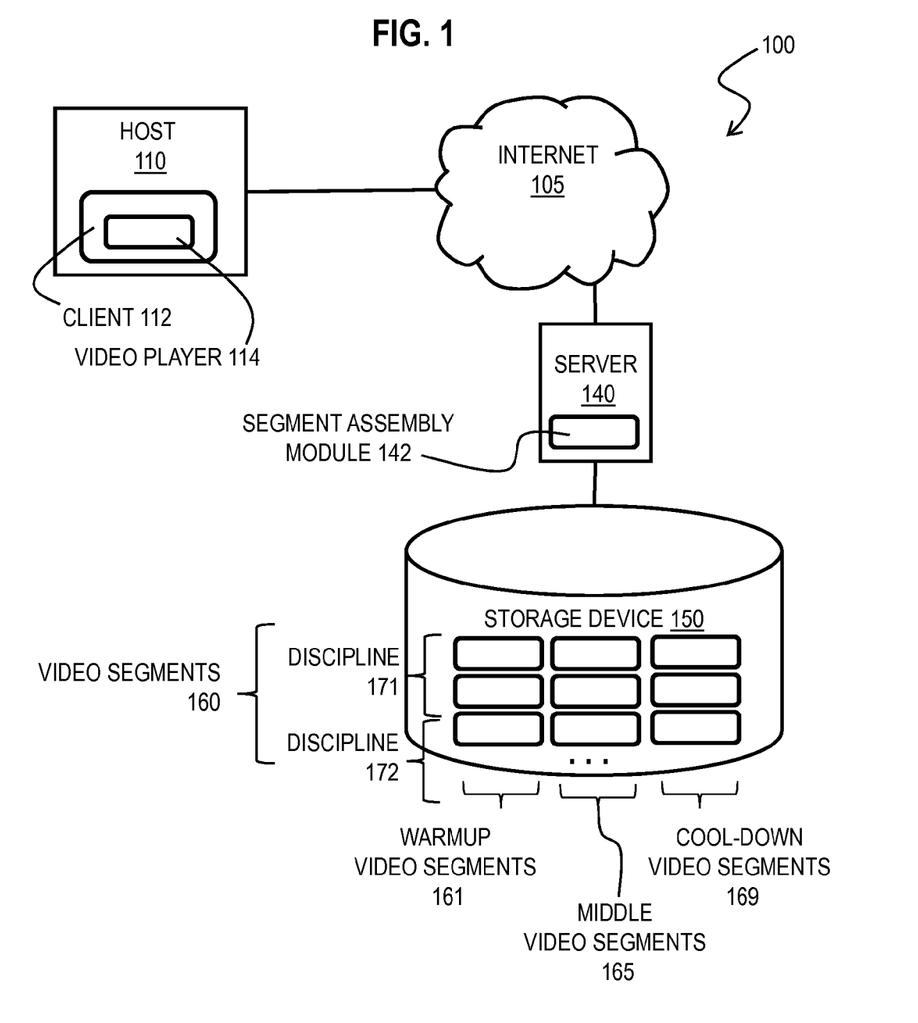
FIG. 1 is a block diagram that illustrates an example server configured to deliver a tailored workout video to a viewer, according to an embodiment.

FIG. 1 is a block diagram that illustrates an example system with a server configured to deliver a tailored workout video to a viewer, according to an embodiment. As is well known in the art, according to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, but not limited to those reasons.

The system 100 includes the Internet 105 that is configured to switch data packets among end nodes using the Internet Protocol (IP) and any of a variety of application level protocols, including the hypertext transfer protocol (HTTP) used to send World Wide Web pages between a World Wide Web client (called a Web browser, or, simply, a browser) and a World Wide Web server. Connected to the Internet 105 are several processes operating on hosts (e.g., host 110), including client 112 and workout video delivery server 140. In some embodiments, the clients 112 are Web browsers and the sever 140 communicates with the client 112 by sending HTTP data packets. In other embodiments, other communications networks or systems and protocols are used, such as a private network, virtual private network, and a cell phone system.

In the illustrated embodiment, a viewer's device, host 110, such as a computer, a tablet or a mobile phone with video screen, includes a client process 112, such as a web browser or mobile application (mobile "app").

In the illustrated embodiment, the server 140 is connected (either directly or through a network, including in some embodiments through the internet 105) to a storage device 150 that holds video segments 160. Video segments 160 include multiple warmup video segments 161 that include content designed to lead a viewer through a warmup set of moves in preparation for an extended or vigorous workout. Video segments 160 also include multiple cool-down video segments 169 that include content designed to lead a viewer through a cool-down set of moves appropriate after an extended or vigorous workout. Furthermore, video segments 160 include multiple middle video segments 163 that include content designed to lead a viewer through set of moves for a particular discipline (e.g., yoga or ballet or interval conditioning) targeting one or more focus areas (e.g., cardio or arms or legs or core/abdomen) with one or more goals (e.g., sculpt, tone, strengthen, or lose weight). Video segments are typically about ten minutes in duration (and may span a range from about five minutes to about 15 minutes) to make assembly of a reasonable workout (e.g., 30 to 60 minutes) reasonably easy.

The server includes a segment assembly module 142 which provides data to the client process 112 on viewer host 110 for selecting a sequence of video segments 160 and which sends to the client 112 a video player module 114 that is configured to play one or more video segments streamed from the server 140, and which streams the selected video segments to a video player 114 installed into client process 112. It is advantageous for the video player module to play multiple video segments automatically without action required by the user between the ending of one video segment and the commencement of the next video segment.

Although processes, equipment, and data structures are depicted in FIG. 1 as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts.

Figure 2:
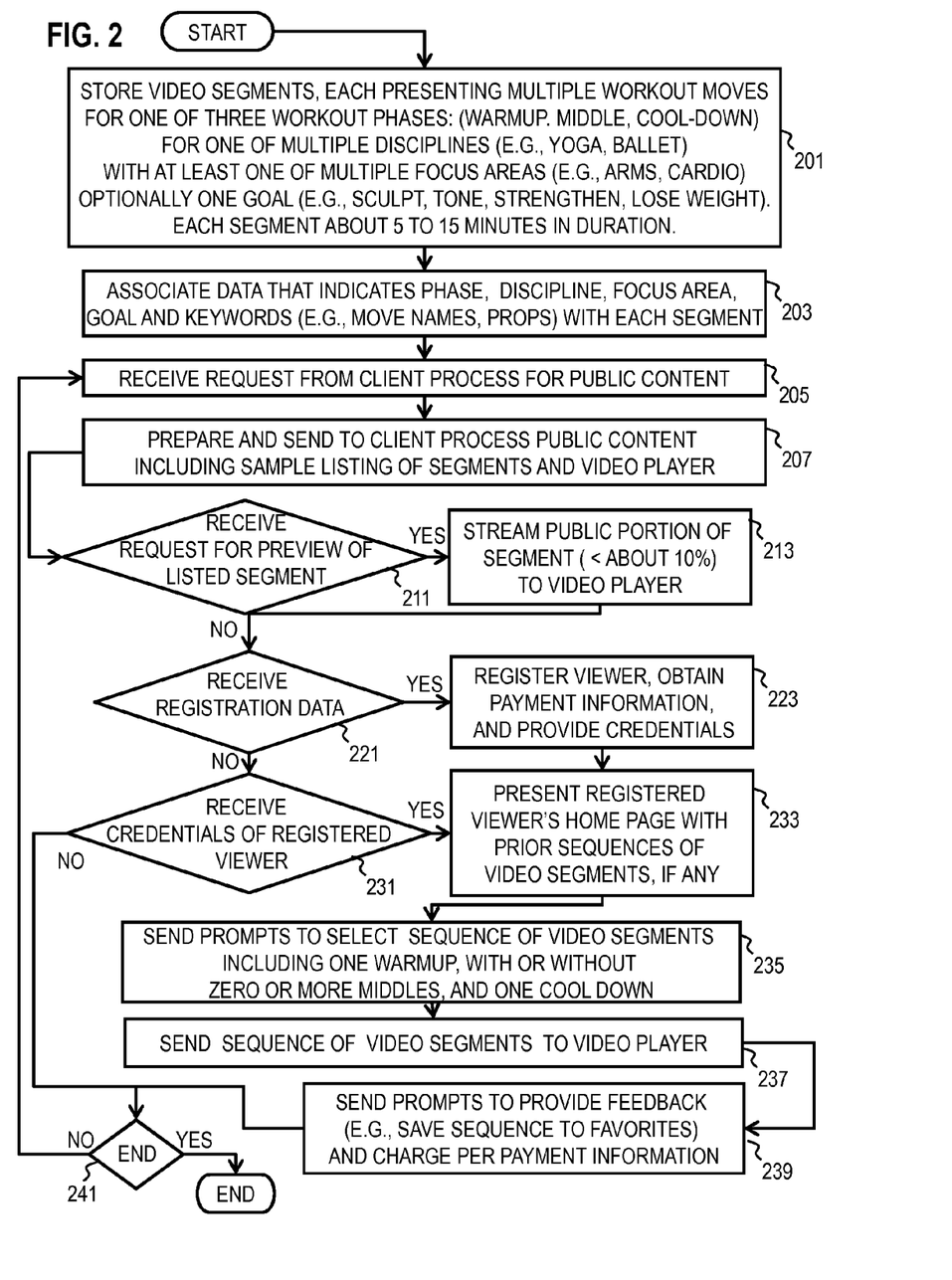
FIG. 2 is a flowchart that illustrates at a high level an example method to deliver a tailored workout video to a viewer, according to an embodiment.

FIG. 2 is a flowchart that illustrates at a high level an example method 200 to deliver a tailored workout video to a viewer, according to an embodiment. For example, the steps of method 200 are performed by server 140 or module 142 alone or in some combination. Although steps are depicted in FIG. 2 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways. In this example method, full functionality is provided only to viewers who have subscribed to and paid for the service.

In step 201 multiple video segments of about 5 minutes to about 15 minutes duration, and preferably about 10 minutes duration, are stored as a video library on a storage device accessible to the server. In step 203, each video segment is tagged by discipline, by phase of workout (e.g., warmup, middle and cool down), and optionally by muscle groups, or other focus elements such as goals like weight loss, or instructor, or some combination.

In step 205, a request is received from a client process, such as a browser that has followed a link to the server. This request is by default a request for public content. In step 207, in response to the request, public content, such as one or more public web pages, is prepared and sent to the client process. In an illustrated embodiment, the public content includes the video player and a listing of some or all video segments in the video library. In some embodiments, some or all of the tags associated with each video are also sent with the public content. The public content includes a prompt for registration data for new viewers and a prompt to logon for viewers already registered (registered viewers). In various embodiments, step 207 includes sending first data for presentation at a client process of a viewer, wherein the first data indicates a matrix of video segments including a set of warmup video segments, cool-down video segments and middle video segments. In some embodiments, step 207 allows the viewer to browse other products available for separate purchase on a catalog page. In some embodiments, step 207 allows the viewer to read a blog from the video instructor on a blog page.

In step 211, it is determined whether a request is received for a preview of a listed video segment. If so, then in step 213, public video content, if any, is streamed to the video player in the client process. In various embodiments, the public video content is a percentage, e.g., less than 10% of a selected video segment, or a special public video segment or preselected one video segment representative of each of the disciplines. If the viewer never registers then control passes eventually, as described below, to step 241.

In step 241 it is determined if conditions are satisfied for the process to end. If so, then the process ends, then process ends. Otherwise the control passes to step 205 to await another request for the public content from the same or different viewer.

In step 221, it is determined whether a request is received with registration data in response to the prompt for new viewers to register. If so, then in step 213, data is sent to the viewer's client process to prompt the viewer to register with the video service. For example, the viewer is prompted for identifying information, payment information, such as an online payment account (e.g., PAYPAL™) or credit card information, or some combination. When registration information is complete, log on credentials (such as user name and password) are provided for an authentication, authorization and accounting (AAA) service. In some embodiments, confirmation is sent to the user via a webpage or external channel, such as email, US post, cell phone text message, etc. Control then passes to step 233, described below.

If registration data for a new viewer is not received in step 221, then in step 231, it is determined whether credentials are received from a registered viewer. In some embodiments, step 231 includes authentication and authorization approval from an AAA service. If not, control passes to step 241 to determine whether to end the process, as described above. If so, then control passes to step 233.

In step 233, the viewer is presented with content specific for that viewer, such as one or more web pages specific to that viewer. The viewer specific content includes, in various embodiments, previous sets of video segments assembled or viewer by that viewer. In additions, function to assemble one or more videos into a new workout is included, such as a link to a page for assembling a new workout. In some embodiments, step 233 allows the viewer to browse other products available for separate purchase on a catalog page. In some embodiments, step 233 allows the viewer to read a blog from the video instructor on a blog page.

In step 235, a prompt is sent to a viewer to select a sequence of video segments, such as one warmup, one or more middle segments and one cool down segment in order. In some embodiments, this includes a prompt for a viewer to select one or more filter criteria, such as one or more disciplines or one or more muscle groups or some combination.

In various embodiments, step 235 also includes receiving from the client process filter data that indicates viewer filter criteria, such as one or more disciplines and one or more muscle groups. In some embodiments, step 235 also includes sending for presentation at the client device, subset data that indicates a filtered set of video segments including a warmup video segment, a cool-down video segment and a middle video segment that each satisfy the filter criteria. In some embodiments, this data also indicates a default order for the filtered set of video segments. In some embodiments, step 235 also includes sending final selection data for presentation at the client process that prompts the viewer to select the two or more videos for the current workout from the filtered set of video segments. In some embodiments, the final selection data also prompts the viewer to determine an order for the two or more video segments in the current workout. In some embodiments, the two or more video segments of the current workout selected by the viewer are received in response to sending the final selection data. In some embodiments, the data received further indicates a selected order for the two or more video segments. If a selected order is not indicated, then the default order is used.

In step 237, two or more video segments for the current workout, in either the selected order if provided, or a default order if not, is sent to the video player 114 in the client process 112 to be presented to the viewer automatically in sequence, without user action required to transition form one video segment to the next. Thus, video segments from all the selected segments is presenting automatically to the viewer in the selected order. Here the selected order is the default order if no other order is selected by the viewer.

In step 239, feedback prompt data is sent to the client process to prompt the viewer to provide feedback to the server. Any feedback generated in response is stored with the viewer's specific information and forwarded to a system administrator or other users, as indicated by the feedback. In various embodiments, the feedback includes one or more of the following: save current workout to favorites (e.g., a favorite playlist); forward the current workout or saved workout to another registered viewer, with or without a rating or comment; record a rating or comment or both for an individual video segment; or, send a message to the instructor. In some embodiments, step 239 includes charging the viewer per payment information, e.g., for the video segments used, or for the next day, month, quarter or year of a time-based registration/membership.

2. Example Embodiments

According to an example embodiment, a matrix of approximately 10 minute workout video segments are stored for access by the server 140, designed to give the viewer the unique experience of mixing & matching these segments together to create their own personalized workouts that can range from 10 min to a recommended 60 minutes to even 90 minutes or longer, depending on the number of segments selected. There are 3 main disciplines in an example embodiment: Interval Conditioning, Yoga, and Ballet Conditioning. Under each header are multiple "warmup" options for safe warm-up, multiple "middle options" for the bulk of the workout, and multiple "ending" options for the stretch/cool down. Each video segment, in addition to being tagged as ballet, yoga or interval conditioning and beginning, middle or end, is also characterized by focus (such as muscle group or goals such as general conditioning, sculpting, strengthening or some combination). The various video segments are then associated with tags that indicate one or more of such focus elements. So the viewer can decide the viewer wants a "one hour workout with a focus on cardio", and be matched with their options to create their own sequence. Perhaps the user wants an 'endurance' based workout, or one that emphasizes "leg strength" or "core work" or "stretches". The viewer is matched with the appropriate segments to create their own individualized workout, specifically tailored to their needs. This matrix provides the user with thousands of options for flow combinations, with only a few hours of actual programming. This way, the viewer never has to do the same workout twice. The viewer can always vary the options and sequencing selected for endless options and variety in fitness routines.

For example, in an illustrated embodiment, the video segments of Table 1 are stored for assembly into a workout to be delivered over the Internet. In this example, there are 58 video segments of 10 to 15 minutes each. Each video is directed to a different discipline and focus and divided among warmup, middle and cool-down. Of the 58 segments, 12 are warmup and 12 are cool-down, and the remaining 34 are middle. In this example, a three segment workout of 30 to 45 minutes can be selected by a viewer in any of 12 by 34 by 12 different arrangements, equaling 4896 different arrangements. Likewise, a four segment workout of 40 minutes to one hour can be formed in any of 161,568 arrangements, even without repeating middle segments, and 166,464 arrangements if middle segments are repeated in some selections. Longer workouts allow even more different combinations. Thus, literally hundreds of thousands of different workouts can be delivered to a viewer, for a lifetime of variety.

To help a viewer select the segments to include in a workout sequence, each segment is not only associated with a warmup, middle or cool-down phase and associated with a discipline such as yoga or ballet or interval conditioning (called "Burn Bliss" in the example embodiment) but is also associated with one or more focus areas. In the illustrated embodiment, other keyword are also associated with the segments, such as names of particular moves (e.g., warrior or plies) or props used (e.g, weights or belts) or particular body parts (e.g., knees, hip) or instructor. Table 2 gives example data associated as keywords with each video segment.

Using the method 200 of FIG. 2 and the video segments of Table 1 and Table 2, all the workouts are challenging, with HIGH intensity options included in each middle video and LOW impact options included in each video segment, so the workouts are safe to practice everyday. The video instructor has created a series of short downloadable segments that can be sequenced for the viewer's optimal workout, no matter the viewer's level of fitness. The viewer may choose from a wide array of personalized full body regimens to assemble a workout of any length, and any intensity to reach the viewer's specific goals the viewer's way. So, whether the viewer is trying to fit into the viewer's skinny jeans, or get fit for an iron man triathlon, the viewer may train smarter with this quick & efficient network of videos to target by body part (legs, arms, core, full body, etc.), discipline (yoga, fitness, or ballet conditioning), or goal (streamlining, strengthening, weight loss). The viewer can reach the viewer's goals in as little as 10 minutes a day, with a workout meant for the viewer. The video instructor may be selected from a cadre of highly talented trainers. The viewer may try a short workout for free or subscribe for a full workout as often as the viewer wants. In some embodiments, the viewer may browse other products available for separate purchase on a catalog page. In some embodiments, the viewer may read a blog from the video instructor on a blog page.

As a registered subscriber the viewer has access to exclusive workouts with the video instructor which are not available anywhere else. The viewer may assemble a personally tailored workout selected from various video segments on the workout page. The site is dedicated to making this journey the viewer's best fitness experience ever. The video instructor is able to help the viewer fine tune the viewer's workouts to specifically reach the viewer's goals. The video instructor can help the viewer select a sequence of content that works for the viewer based on answers to a short list of questions about goals and problems body parts, whatever the current & future level of the viewer's practice.

In some embodiments, a registered viewer may watch an introductory video to learn (or recall) how best to assemble a workout from the array of video segments on the products page. The viewer is instructed to "Start with a warm-up video clip, move to one or more middle sections engaging the whole body or targeted to specific body parts, such as arms, legs and glutes or core and abs, and finish with a cool-down video clip. Thousands of different workout combinations are possible to keep things interesting as you keep coming back for more. In some embodiments, one color strip highlights video segments in yoga; a different color strip highlights video segments in ballet; and a third color strip highlights video segments in interval conditioning. A viewer may mix and match across disciplines to make A tailored workout.

In some embodiments, the viewer is informed of subscription/membership options by the following text "Our subscriptions require you to sign up for an Account. When you do, we'll ask for personal information, like your name, email address, telephone number or credit card. Every reasonable attempt is made to keep this information private and we do not share this information except as necessary to execute transactions approved by you. If you want to take full advantage of the sharing features we offer, we might also ask you to create a publicly visible profile, which may include your nickname and photo and birthdate, at your option. Public information is made public to any user and is not kept private."

3. Hardware Overview

Figure 3:
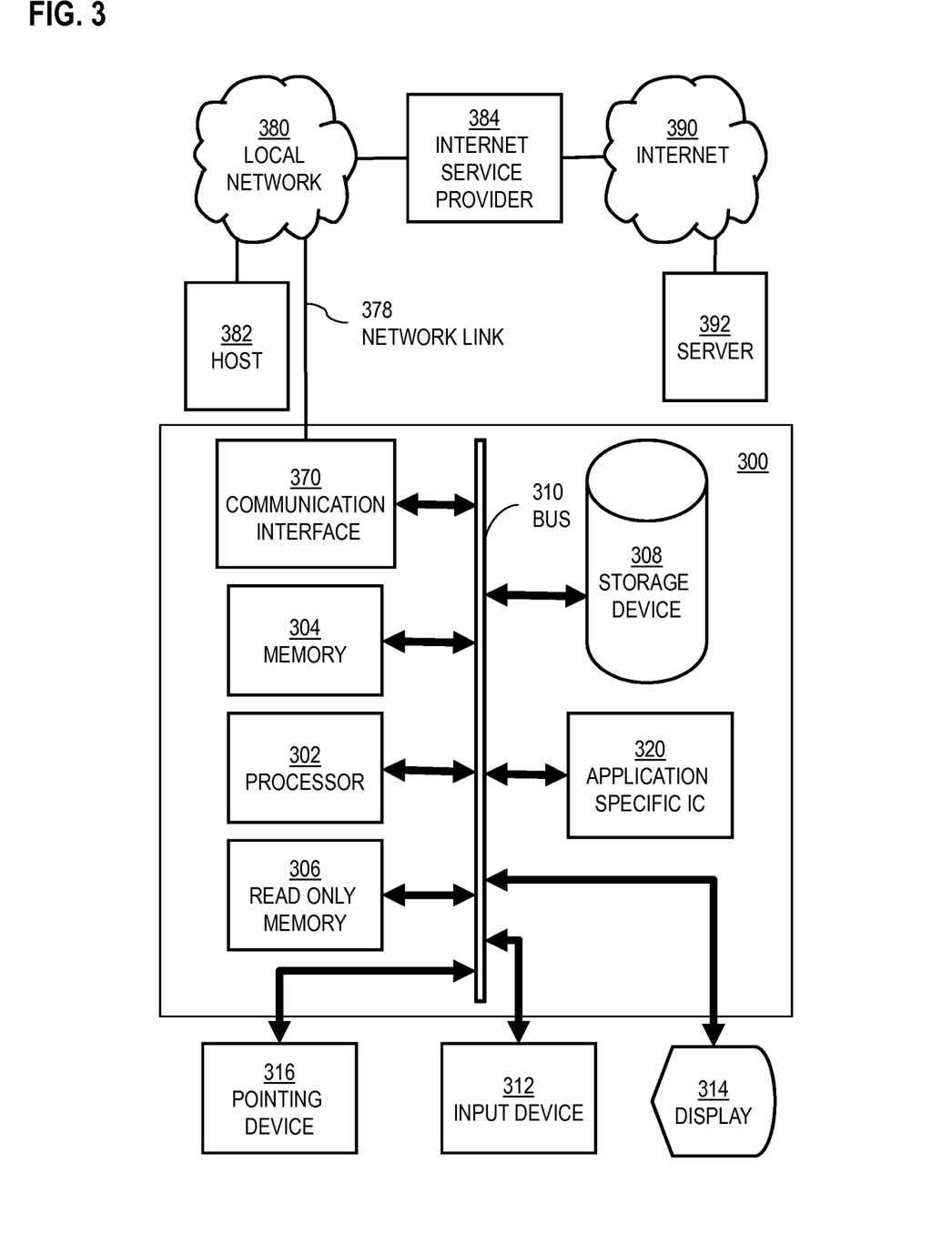
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a communication mechanism such as a bus 310 for passing information between other internal and external components of the computer system 300. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit).). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 300, or a portion thereof, constitutes a means for performing one or more steps of one or more methods described herein.

A sequence of binary digits constitutes digital data that is used to represent a number or code for a character. A bus 310 includes many parallel conductors of information so that information is transferred quickly among devices coupled to the bus 310. One or more processors 302 for processing information are coupled with the bus 310. A processor 302 performs a set of operations on information. The set of operations include bringing information in from the bus 310 and placing information on the bus 310. The set of operations also typically include comparing two or more units of information, shifting positions of units of information, and combining two or more units of information, such as by addition or multiplication. A sequence of operations to be executed by the processor 302 constitute computer instructions.

Computer system 300 also includes a memory 304 coupled to bus 310. The memory 304, such as a random access memory (RAM) or other dynamic storage device, stores information including computer instructions. Dynamic memory allows information stored therein to be changed by the computer system 300. RAM allows a unit of information stored at a location called a memory address to be stored and retrieved independently of information at neighboring addresses. The memory 304 is also used by the processor 302 to store temporary values during execution of computer instructions. The computer system 300 also includes a read only memory (ROM) 306 or other static storage device coupled to the bus 310 for storing static information, including instructions, that is not changed by the computer system 300. Also coupled to bus 310 is a non-volatile (persistent)

storage device 308, such as a magnetic disk or optical disk, for storing information, including instructions, that persists even when the computer system 300 is turned off or otherwise loses power.

Information, including instructions, is provided to the bus 310 for use by the processor from an external input device 312, such as a keyboard containing alphanumeric keys operated by a human user, or a sensor. A sensor detects conditions in its vicinity and transforms those detections into signals compatible with the signals used to represent information in computer system 300. Other external devices coupled to bus 310, used primarily for interacting with humans, include a display device 314, such as a cathode ray tube (CRT) or a liquid crystal display (LCD), for presenting images, and a pointing device 316, such as a mouse or a trackball or cursor direction keys, for controlling a position of a small cursor image presented on the display 314 and issuing commands associated with graphical elements presented on the display 314.

In the illustrated embodiment, special purpose hardware, such as an application specific integrated circuit (IC) 320, is coupled to bus 310. The special purpose hardware is configured to perform operations not performed by processor 302 quickly enough for special purposes. Examples of application specific ICs include graphics accelerator cards for generating images for display 314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 300 also includes one or more instances of a communications interface 370 coupled to bus 310. Communication interface 370 provides a two-way communication coupling to a variety of external devices that operate with their own processors, such as printers, scanners and external disks. In general the coupling is with a network link 378 that is connected to a local network 380 to which a variety of external devices with their own processors are connected. For example, communication interface 370 may be a parallel port or a serial port or a universal serial bus (USB) port on a personal computer. In some embodiments, communications interface 370 is an integrated services digital network (ISDN) card or a digital subscriber line (DSL) card or a telephone modem that provides an information communication connection to a corresponding type of telephone line. In some embodiments, a communication interface 370 is a cable modem that converts signals on bus 310 into signals for a communication connection over a coaxial cable or into optical signals for a communication connection over a fiber optic cable. As another example, communications interface 370 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 370 sends and receives electrical, acoustic or electromagnetic signals, including infrared and optical signals, that carry information streams, such as digital data.

The term computer-readable medium is used herein to refer to any medium that participates in providing information to processor 302, including instructions for execution. Such a medium may take many forms, including, but not limited to, non-volatile media, volatile media and transmission media. Non-volatile media include, for example, optical or magnetic disks, such as storage device 308. Volatile media include, for example, dynamic memory 304. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 302, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 302, except for carrier waves and other signals.

Logic encoded in one or more tangible media includes one or both of processor instructions on a computer-readable storage media and special purpose hardware, such as ASIC 320.

Network link 378 typically provides information communication through one or more networks to other devices that use or process the information. For example, network link 378 may provide a connection through local network 380 to a host computer 382 or to equipment 384 operated by an Internet Service Provider (ISP). ISP equipment 384 in turn provides data communication services through the public, world-wide packet-switching communication network of networks now commonly referred to as the Internet 390. A computer called a server 392 connected to the Internet provides a service in response to information received over the Internet. For example, server 392 provides information representing video data for presentation at display 314.

The invention is related to the use of computer system 300 for implementing the techniques described herein. According to one embodiment of the invention, those techniques are performed by computer system 300 in response to processor 302 executing one or more sequences of one or more instructions contained in memory 304. Such instructions, also called software and program code, may be read into memory 304 from another computer-readable medium such as storage device 308. Execution of the sequences of instructions contained in memory 304 causes processor 302 to perform the method steps described herein. In alternative embodiments, hardware, such as application specific integrated circuit 320, may be used in place of or in combination with software to implement the invention. Thus, embodiments of the invention are not limited to any specific combination of hardware and software.

The signals transmitted over network link 378 and other networks through communications interface 370, carry information to and from computer system 300. Computer system 300 can send and receive information, including program code, through the networks 380, 390 among others, through network link 378 and communications interface 370. In an example using the Internet 390, a server 392 transmits program code for a particular application, requested by a message sent from computer 300, through Internet 390, ISP equipment 384, local network 380 and communications interface 370. The received code may be executed by processor 302 as it is received, or may be stored in storage device 308 or other non-volatile storage for later execution, or both. In this manner, computer system 300 may obtain application program code in the form of a signal on a carrier wave.

Various forms of computer readable media may be involved in carrying one or more sequence of instructions or data or both to processor 302 for execution. For example, instructions and data may initially be carried on a magnetic disk of a remote computer such as host 382. The remote computer loads the instructions and data into its dynamic memory and sends the instructions and data over a telephone line using a modem. A modem local to the computer system 300 receives the instructions and data on a telephone line and uses an infra-red transmitter to convert the instructions and data to a signal on an infra-red a carrier wave serving as the network link 378. An infrared detector serving as communications interface 370 receives the instructions and data carried in the infrared signal and places information representing the instructions and data onto bus 310. Bus 310 carries the information to memory 304 from which processor 302 retrieves and executes the instructions using some of the data sent with the instructions. The instructions and data received in memory 304 may optionally be stored on storage device 308, either before or after execution by the processor 302.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

TABLE 1

| | | | | | | | |
|---|---|---|---|---|---|---|---|
| sun salute A | Sun Salutation A | 00:10:00 | 750 kb | MPG, AVI | Yoga | Warmup | Y00001 |
| Y sun salute B | Sun Salutation B | 00:10:00 | 750 kb | MPG, AVI | Yoga | Warmup | Y00002 |
| Y sun saluteB with variations | Sun Salutation B+ | 00:10:00 | 750 kb | MPG, AVI | Yoga | Warmup | Y00003 |
| Y sun salute C | Sun Salutation C | 00:10:00 | 750 kb | MPG, AVI | Yoga | Warmup | Y00004 |
| Y part 1 a | Yoga Flow: Legs | 00:10:00 | 750 kb | MPG, AVI | Yoga | Legs | Y10001 |
| Y part 1 b | Yoga Flow: Core | 00:10:00 | 750 kb | MPG, AVI | Yoga | Abs | Y10002 |
| Y part 1 c | Yoga Flow: Arms | 00:10:00 | 750 kb | MPG, AVI | Yoga | Arms | Y10003 |
| Y part 1 d | Full Body Flow | 00:10:00 | 750 kb | MPG, AVI | Yoga | Full Body | Y10004 |
| Y part 1/2 a | Full Body Flow | 00:10:00 | 750 kb | MPG, AVI | Yoga | Full Body | Y15001 |
| Y part 1/2 b | Yoga Flow: Core | 00:10:00 | 750 kb | MPG, AVI | Yoga | Abs | Y15002 |
| Y part 1/2 c | Yoga Flow: Legs | 00:10:00 | 750 kb | MPG, AVI | Yoga | Legs | Y15003 |
| Y part 1/2 d | Full Body Flow | 00:10:00 | 750 kb | MPG, AVI | Yoga | Legs/Abs | Y15004 |
| Y part 2 a | Full Body Flow | 00:10:00 | 750 kb | MPG, AVI | Yoga | Legs/Abs | Y20001 |
| Y part 2 b | Cardio Body Flow | 00:10:00 | 750 kb | MPG, AVI | Yoga | Full Body | Y20002 |
| Y part 2 c | Cardio Body Flow | 00:10:00 | 750 kb | MPG, AVI | Yoga | Full Body | Y20003 |
| Y part 2 d | Cardio Body Flow | 00:10:00 | 750 kb | MPG, AVI | Yoga | Full Body | Y20004 |
| Y part 2 e | Yoga Flow: Core | 00:10:00 | 750 kb | MPG, AVI | Yoga | Abs | Y20005 |
| Y part 2 f | Yoga Flow: Legs | 00:10:00 | 750 kb | MPG, AVI | Yoga | Legs | Y20006 |
| Y part 2 g | Full Body Flow | 00:10:00 | 750 kb | MPG, AVI | Yoga | Full Body | Y20007 |
| Y part 2 h | Yoga Flow: Legs | 00:10:00 | 750 kb | MPG, AVI | Yoga | Legs | Y20008 |
| Y series A | Slow Flow cooldown | 00:10:00 | 750 kb | MPG, AVI | Yoga | cooldown | Y90001 |
| Y series B | Slow Flow cooldown | 00:10:00 | 750 kb | MPG, AVI | Yoga | cooldown | Y90002 |
| Y series C | Slow Flow cooldown | 00:10:00 | 750 kb | MPG, AVI | Yoga | cooldown | Y90003 |
| Y series D | Slow Flow cooldown | 00:10:00 | 750 kb | MPG, AVI | Yoga | cooldown | Y90004 |
| B Arms a | Ballet Body Arms | 00:10:00 | 750 kb | MPG, AVI | Ballet | Arms/warmup | B10001 |
| B Arms b | Ballet Body Arms | 00:10:00 | 750 kb | MPG, AVI | Ballet | Arms/warmup | B10002 |
| B Arms c | Ballet Body Arms | 00:10:00 | 750 kb | MPG, AVI | Ballet | Arms/warmup | B10003 |
| B Legs a | Dancer's Legs | 00:10:00 | 750 kb | MPG, AVI | Ballet | Legs | B20001 |
| B Legs b | Dancer's Legs | 00:10:00 | 750 kb | MPG, AVI | Ballet | Legs | B20002 |
| B Legs c | Dancer's Legs | 00:10:00 | 750 kb | MPG, AVI | Ballet | Legs | B20003 |
| B Legs d | Dancer's Legs | 00:10:00 | 750 kb | MPG, AVI | Ballet | Legs | B20004 |
| B Glutes a | Ballet Booty | 00:10:00 | 750 kb | MPG, AVI | Ballet | Glutes | B30001 |
| B Glutes b | Ballet Booty | 00:10:00 | 750 kb | MPG, AVI | Ballet | Glutes | B30002 |
| B Glutes c | Ballet Booty | 00:10:00 | 750 kb | MPG, AVI | Ballet | Glutes/cardio | B30003 |
| B Glutes d | Ballet Booty | 00:10:00 | 750 kb | MPG, AVI | Ballet | Glutes | B30004 |
| B Glutes e | Ballet Booty | 00:10:00 | 750 kb | MPG, AVI | Ballet | Glutes | B30005 |
| B Glutes f | Cardio Body | 00:10:00 | 750 kb | MPG, AVI | Ballet | Glutes/cardio | B30006 |
| B Abs a | Cardio Abs | 00:10:00 | 750 kb | MPG, AVI | Ballet | Abs/Cardio | B40001 |
| B Abs b | Cardio Abs | 00:10:00 | 750 kb | MPG, AVI | Ballet | Abs/cardio | B40002 |
| B Abs c | Cardio Abs | 00:10:00 | 750 kb | MPG, AVI | Ballet | Abs/cardio | B40003 |
| B Abs d | Cardio Abs | 00:10:00 | 750 kb | MPG, AVI | Ballet | Abs/cardio | B40004 |
| B Breathe a | Ballet Bliss | 00:10:00 | 750 kb | MPG, AVI | Ballet | cooldown | B90001 |
| B Breathe b | Ballet Bliss | 00:10:00 | 750 kb | MPG, AVI | Ballet | cooldown | B90002 |
| B Breathe c | Ballet Bliss | 00:10:00 | 750 kb | MPG, AVI | Ballet | cooldown | B90003 |
| B Breathe d | Ballet Bliss | 00:10:00 | 750 kb | MPG, AVI | Ballet | cooldown | B90004 |
| B Breathe e | Ballet Bliss | 00:10:00 | 750 kb | MPG, AVI | Ballet | cooldown | B90005 |
| F Arms a | Upper Body Bliss | 00:10:00 | 750 kb | MPG, AVI | Fitness | Arms | F10001 |
| F Arms b | Upper Body Bliss | 00:10:00 | 750 kb | MPG, AVI | Fitness | Arms | F10002 |
| F Arms c | Upper Body Bliss | 00:10:00 | 750 kb | MPG, AVI | Fitness | Arms | F10003 |
| F Arms d | Upper Body Bliss | 00:10:00 | 750 kb | MPG, AVI | Fitness | Arms | F10004 |
| F Arms e | Upper Body Bliss | 00:10:00 | 750 kb | MPG, AVI | Fitness | Arms | F10005 |
| F Legs a | Cardio Body Bliss | 00:10:00 | 750 kb | MPG, AVI | Fitness | Legs/cardio | F30001 |
| F Legs b | Burn Bliss Legs | 00:10:00 | 750 kb | MPG, AVI | Fitness | Legs | F30002 |
| F Legs c | Burn Bliss Body | 00:10:00 | 750 kb | MPG, AVI | Fitness | Legs/cardio | F30003 |

TABLE 1-continued

| | | | | | | | |
|---|---|---|---|---|---|---|---|
| F Legs d | Burn Bliss legs | 00:10:00 | 750 kb | MPG, AVI | Fitness | Legs | F30004 |
| F Balance a | Burn Bliss Body | 00:10:00 | 750 kb | MPG, AVI | Fitness | Abs/cardio/cool | F90001 |
| F Balance b | Burn Bliss Body | 00:10:00 | 750 kb | MPG, AVI | Fitness | Legs/cardio/cool | F90002 |
| F Balance c | Burn Bliss Body | 00:10:00 | 750 kb | MPG, AVI | Fitness | Abs/cardio/cool | F90003 |

TABLE 2

ELISE JOAN FITNESS CONFIDENTIAL

| | | | |
|---|---|---|---|
| YOGA | Y00001 | sun salute A | beginning, warmup, vinyasas, tadasana |
| YOGA | Y00002 | sun salute B | beginning, warmup, vinyasas, tadasana |
| YOGA | Y00003 | sun saluteB with variations | beginning, warmup, vinyasas, tadasana |
| YOGA | Y00004 | sun salute C | beginning, warmup, vinyasas, tadasana |
| YOGA | Y10001 | part 1 a | middle, part 1, vinyasas, downward dog, chair, crescent twist, leg, strength, weight props |
| YOGA | Y10002 | part 1 b | middle, part 1, vinyasas, downward dog, warrior, core, balance |
| YOGA | Y10003 | part 1 c | middle, part 1, vinyasas, downward dog, plank, chatarungas, arms |
| YOGA | Y10004 | part 1 d | middle, part 1, vinyasas, downward dog, sun salute, endurance |
| YOGA | Y15001 | part 1/2 a | middle, part 1, part 2, vinyasas, downward dog, warrier, cardio |
| YOGA | Y15002 | part 1/2 b | middle, part 1, part 2, vinyasas, downward dog, warrier, half moon, cardio, balance |
| YOGA | Y15003 | part 1/2 c | middle, part 1, part 2, vinyasas, downward dog, warrier, chair, lunges, leg lifts, glutes, legs, strength |
| YOGA | Y15004 | part 1/2 d | middle, part 1, part 2, vinyasas, downward dog, crescent, plank, core, legs |
| YOGA | Y20001 | part 2 a | middle, part 2, vinyasas, downward dog, warrier, eagle, chair, legs, core, balance, weight props |
| YOGA | Y20002 | part 2 b | middle, part 2, vinyasas, downward dog, boat, plank, full body, weight props |
| YOGA | Y20003 | part 2 c | middle, part 2, vinyasas, downward dog, weight props, half moon, boat, full body |
| YOGA | Y20004 | part 2 d | middle, part 2, vinyasas, downward dog, crescent, half moon, chair, detox |
| YOGA | Y20005 | part 2 e | middle, part 2, vinyasas, downward dog, chair, uttita hasta, boat, core, balance |
| YOGA | Y20006 | part 2 f | middle, part 2, vinyasas, downward dog, weight props, triangle, lunges, legs, glutes |
| YOGA | Y20007 | part 2 g | middle, part 2, vinyasas, downward dog, warrior, half moon, lunges, cardio |
| YOGA | Y20008 | part 2 h | middle, part 2, vinyasas, downward dog, triangle, splits, legs, hamstrings |
| YOGA | Y90001 | series A | ending, warmdown, cooldown, downward dog, savasana, core, hip, hamstring, back |
| YOGA | Y90002 | series B | ending, warmdown, cooldown, downward dog, savasana, core, hip, hamstring, back |
| YOGA | Y90003 | series C | ending, warmdown, cooldown, downward dog, savasana, core, hip, hamstring, back |
| YOGA | Y90004 | series D | ending, warmdown, cooldown, downward dog, savasana, core, hip, hamstring, back |
| BALLET | B10001 | Arms a | beginning, warmup, port de bras, plank, stretch, strength, arms |
| BALLET | B10002 | Arms b | beginning, warmup, port de bras, pushups, cardio, strength, arms |
| BALLET | B10001 | Arms c | beginning, warmup, port de bras, plank, pushups, strength, arms, core |
| BALLET | B20001 | Legs a | middle, legs, plies, ronde jambs en l'air, releves, endurance, bum |
| BALLET | B20002 | Legs b | middle, legs, attitude swings, grand bat mas, leg lifts, cardio |
| BALLET | B20003 | Legs c | middle, legs, plies, lunges, thigh, bum |
| BALLET | B20004 | Legs d | middle, legs, weight props, lunges, leg lifts, port de bras, hinges, strength, balance |
| BALLET | B30001 | Glutes a | middle, glutes, kneeling, plank, hips, strength |
| BALLET | B30002 | Glutes b | middle, glutes, pretzel, stretch, hips, side, |
| BALLET | B30003 | Glutes c | middle, glutes, plank, prone, frog, full body |
| BALLET | B30004 | Glutes d | middle, glutes, fold-over, balance, chair prop |
| BALLET | B30005 | Glutes e | middle, glutes, pelvic tilt, plank, leg lifts, bum |
| BALLET | B30006 | Glutes f | middle, glutes, warrior, leg lifts, split, lunges, cardio |
| BALLET | B40001 | Abs a | middle, abs, core, twists, curl, stretch |
| BALLET | B40002 | Abs b | middle, abs, core, boat, scissors, twist, stretch |
| BALLET | B40003 | Abs c | middle, abs, core, fold-over, beats, lifts, knee, hips |
| BALLET | B40004 | Abs d | middle, abs, core, curl, bicycle, twist, hip |
| BALLET | B90001 | Breathe a | ending, warmdown, cooldown, hips |
| BALLET | B90002 | Breathe b | ending, warmdown, cooldown, hamstring, back, stretch |
| BALLET | B90003 | Breathe c | ending, warmdown, cooldown, stretch, full body, seated |
| BALLET | B90004 | Breathe d | ending, warmdown, cooldown, stretch, full body, supine |
| BALLET | B90005 | Breathe e | ending, warmdown, cooldown, quadriceps, legs, psoas, stretch |
| Blissful Fitness | F10001 | Fit Arms a | beginning, warmup, arms, pushups, plank, triceps, weight props, toning |
| Blissful Fitness | F10002 | Fit Arms b | beginning, warmup, arms, tricep pushups, plank, weight props, toning |
| Blissful Fitness | F10003 | Fit Arms c | beginning, warmup, arms, plank, pushups, weight props, cardio |
| Blissful Fitness | F10004 | Fit Arms d | beginning, warmup, arms, plank, climb, vinyasas, cardio |
| Blissful Fitness | F10005 | Fit Arms e | beginning, warmup, arms, stretch, heart openers, plank |
| Blissful Fitness | F30001 | Fit Legs a | middle, legs, knee lifts, lunges, squat, cardio |
| Blissful Fitness | F30002 | Fit Legs b | middle, legs, weight props, pulses, crunches, vinyasas, crescent, endurance |
| Blissful Fitness | F30003 | Fit Legs c | middle, legs, weight props, knee lifts, lunges, press, squat, jumps, cardio |
| Blissful Fitness | F30004 | Fit Legs d | middle, legs, weight props, knee lifts, skaters, punches, squat, jump, crescent |
| Blissful Fitness | F90001 | Balance a | ending, warmdown, cooldown, full body, balance, strenght, flexibility, weight props, presses, lifts, half moon, core, hips |
| Blissful Fitness | F90002 | Balance b | ending, warmdown, cooldown, full body, balance, strenght, flexibility, weight props, warrior, triangle, chair, leg lifts, stretch, uttita hasta |
| Blissful Fitness | F90003 | Balance c | ending, warmdown, cooldown, full body, balance, strenght, flexibility, triangle, pyramid, twist, half moon, hip, split, core, stretch, seated |

What is claimed is:

1. A non-transitory computer-readable medium carrying one or more sequences of instructions, wherein execution of the one or more sequences of instructions by one or more processors causes the one or more processors to perform the steps of:
sending first data for presentation at a client process of a viewer, wherein the first data indicates a matrix of continuous instructor-led video segments including a set of warmup video segments, cool-down video segments and middle video segments, each segment including multiple different exercises and having a duration in a range from about 5 minutes to about 15 minutes;
obtaining from the client process second data indicating two or more video segments selected by the viewer for a tailored workout; and
streaming automatically, to the client process of the viewer, video from all the selected video segments without viewer action required to transition from one of the selected video segments to another of the selected video segments, wherein the tailored workout for the viewer has a duration at least equal to a sum of durations of the corresponding selected video segments.

2. A non-transitory computer-readable medium as recited in claim 1, wherein the matrix of video segments includes the set of warmup video segments, cool-down video segments and middle video segments in each of a plurality of disciplines.

3. A non-transitory computer-readable medium as recited in claim 2, wherein the plurality of disciplines includes at least two of yoga or ballet or interval conditioning.

4. A non-transitory computer-readable medium as recited in claim 1, wherein each video segment is tagged with one or more muscle groups that are subjected to extra work by the video segment, where the muscle groups are selected from a group comprising arms, legs, core, buttocks, full body and cardio.

5. A non-transitory computer-readable medium as recited in claim 1, wherein execution of the one or more sequences of instructions further causes the one or more processors to perform the steps of:
in response to sending the first data, receiving from the client process third data that indicates viewer filter criteria; and
sending fourth data for presentation at the client process, wherein
the first data includes a prompt for a viewer to select one or more filter criteria;
the fourth data indicates a filtered set of video segments including a warmup video segment, a cool-down video segment and a middle video segment that each satisfy the filter criteria, and
the second data, indicating the two or more video segments selected by the viewer, is received in response to sending the fourth data.

6. A non-transitory computer-readable medium as recited in claim 5, wherein:
execution of the one or more sequences of instructions further causes the one or more processors to perform sending fifth data for presentation at the client process that prompts the viewer to select the two or more videos indicated in the second data from the filtered set of videos; and
the second data indicating the two or more video segments selected by the viewer is received in response to sending the fifth data.

7. A non-transitory computer-readable medium as recited in claim 6, wherein:
the fourth data indicates a default order for the filtered set of video segments; and
the fifth data also prompts the viewer to determine an order for the two or more video segments;
the second data further indicates a selected order for the two or more video segments; and
presenting automatically to the viewer video segments from all the selected segments is done in the selected order.

8. A non-transitory computer-readable medium as recited in claim 5, wherein the viewer filter criteria indicates one or more muscle groups.

9. A non-transitory computer-readable medium as recited in claim 5, wherein the viewer filter criteria indicates one or more disciplines selected from yoga and ballet and interval conditioning.

10. A system comprising:
at least one processor; and
at least one memory including one or more sequences of instructions,
the at least one memory and the one or more sequences of instructions configured to, with
the at least one processor, cause the apparatus to perform at least the following,
sending first data for presentation at a client process of a viewer, wherein the first data indicates a matrix of continuous instructor-led video segments including a set of warmup video segments, cool-down video segments and middle video segments, each segment including multiple different exercises and having a duration in a range from about 5 minutes to about 15 minutes;
obtaining from the client process second data indicating two or more video segments selected by the viewer for a tailored workout; and
streaming automatically, to the client process of the viewer, video from all the selected video segments without viewer action required to transition from one of the selected video segments to another of the selected video segments, wherein the tailored workout for the viewer has a duration at least equal to a sum of durations of the corresponding selected video segments.

11. A method comprising:
causing a server process on a server processor to present to a viewer's client process on the viewer's device first data that indicates a matrix of continuous instructor-led video segments including a set of warmup video segments, cool-down video segments and middle video segments, each segment including multiple different exercises and having a duration in a range from about 5 minutes to about 15 minutes;
causing the server process to obtain from the client process second data indicating two or more video segments selected by the viewer for a tailored workout; and
causing the server process to stream automatically, to the viewer's client process, video from all the selected video segments without viewer action required to transition from one of the selected video segments to another of the selected video segments, wherein the tailored workout for the viewer has a duration at least equal to a sum of durations of the corresponding selected video segments.

12. A method as recited in claim 11, wherein the matrix of video segments includes the set of warmup video segments, cool-down video segments and middle video segments in each of a plurality of disciplines.

13. A method as recited in claim 12, wherein the plurality of disciplines includes at least two of yoga or ballet or interval conditioning.

14. A method as recited in claim 11, wherein each video segment is tagged with one or more muscle groups that are subjected to extra work by the video segment, where the muscle groups are selected from a group comprising arms, legs, core, buttocks, full body and cardio.

15. A method as recited in claim 11, further comprising:
in response to causing the first data to be sent, receiving from the client process third data that indicates viewer filter criteria; and
causing the server process to send fourth data for presentation at the client process,
wherein
the first data includes a prompt for a viewer to select one or more filter criteria;
the fourth data indicates a filtered set of video segments including a warmup video segment, a cool-down video segment and a middle video segment that each satisfy the filter criteria, and
the second data, indicating the two or more video segments selected by the viewer, is received in response to sending the fourth data.

16. A method as recited in claim 15, wherein the viewer filter criteria indicates one or more muscle groups.

17. A method as recited in claim 15, wherein the viewer filter criteria indicates one or more disciplines selected from yoga and ballet and interval conditioning.

\* \* \* \* \*